United States Patent [19]

Narita

[11] Patent Number: 4,663,980
[45] Date of Patent: May 12, 1987

[54] RACK AND PINION STEERING GEAR

[75] Inventor: Katsuyuki Narita, Zama, Japan

[73] Assignee: Nissan Motor Co., Ltd., Yokohama, Japan

[21] Appl. No.: 637,723

[22] Filed: Aug. 6, 1984

[30] Foreign Application Priority Data

Aug. 9, 1983 [JP] Japan .................. 58-146037

[51] Int. Cl.⁴ .............................. B62D 3/12
[52] U.S. Cl. ...................... 74/422; 74/498; 74/594; 280/96; 403/76
[58] Field of Search ........... 403/76, 77, 4; 280/96; 74/422, 498, 18.2, 89.17, 594; 180/79, 132, 148, 151, 160

[56] References Cited

U.S. PATENT DOCUMENTS

| | | | |
|---|---|---|---|
| 1,523,676 | 1/1925 | Trussell | 474/112 |
| 1,686,672 | 10/1928 | Thompson | 474/112 |
| 2,309,281 | 1/1943 | Steele | 403/77 |
| 2,388,305 | 11/1945 | Beckwith | 474/112 |
| 2,900,196 | 8/1959 | Nienke | 403/77 |
| 4,127,186 | 11/1978 | Koyano et al. | 74/498 |
| 4,162,859 | 7/1979 | McAfee | 403/77 |
| 4,189,955 | 2/1980 | Bishop | 74/498 |
| 4,316,519 | 2/1982 | Taig | 180/148 |
| 4,531,426 | 7/1985 | Iijima | 74/498 |
| 4,572,024 | 2/1986 | Narita | 74/422 |

FOREIGN PATENT DOCUMENTS 58-97561 6/1983 Japan .
1181353 2/1970 United Kingdom .

Primary Examiner—Allan D. Herrmann
Attorney, Agent, or Firm—Schwartz, Jeffery, Schwaab, Mack, Blumenthal & Evans

[57] ABSTRACT

A ball joint connecting an end of a rack gear to an end of a tie rod is constructed to have a center of rotary motion which is offset from the center axis of the rack gear and to be adjustable to selectively change the direction in which the center of rotary motion of the ball joint is set apart from the center axis of the rack gear.

9 Claims, 3 Drawing Figures

RACK AND PINION STEERING GEAR

BACKGROUND OF THE INVENTION

1. Field of the Invention

The present invention relates in general to rack and pinion steering gears for road vehicles and more particularly to a ball joint for joining a rack gear to an inner end of a side rod or tie rod whose outer end is joined to a knuckle arm.

2. Description of the Prior Art

A road vehicle rack and pinion steering gear includes a pinion adapted to be rotated by a manually operated steering wheel and a rack gear meshed with the pinion for lateral reciprocating motion. The rack gear is joined to the inner ends of tie rods by means of ball joints. The outer ends of the tie rods are connected to knuckle arms which in turn are connected to steerable vehicle wheels so that rotation of the steering wheel causes the pinion to rotate and move the rack gear which in turn causes the tie rods and the knuckle arms to move and turn the steerable vehicle wheels Arrangement of such ball joints is important since it is closely related to the toe change characteristic of the steering gear, as is well known in the art. An example of a ball joint arrangement which is effective for minimizing toe change is disclosed in the Japanese Provisional Patent Publication No. 58-97561. In this arrangement, such a ball joint is utilized whose center of rotary motion is offset from the center axis of the rack gear. However, the direction in which the center of rotary motion is set apart from the center axis of the rack gear is not changeable but fixed. Due to this, the toe change characteristic of the steering gear is not adjustable. Furthermore, in the above ball joint arrangement, the rack gear is required to have a pair of transverse taper holes adapted to receive therein correspondingly tapered shanks ending in balls and also to have a pair of flat cuts for providing seats on which nuts for attachment of the shanks are placed. Such transverse taper holes and the flat cuts inevitably result in an increased overall thickness and weight of the rack gear due to the necessity of increasing the strength of same.

SUMMARY OF THE INVENTION

In accordance with the present invention, there is provided a rack and pinion steering gear for a road vehicle which comprises as usual a pinion rotatable with a manually operated steering wheel, a rack gear meshed with the pinion for reciprocating motion, a tie rod for transmitting motion of the rack gear to a steerable vehicle wheel, and a ball joint connecting the tie rod to the rack gear.

In accordance with the present invention, the ball joint is constructed to have a center of rotary motion which is offset from the center axis of the rack gear and to be adjustable to selectively change the direction in which the center of rotary motion is set apart from the center axis of the rack gear.

This structure makes it possible to selectively or adjustably change the toe change characteristic of the rack and pinion steering gear.

It is accordingly an object of the present invention to provide a rack and pinion steering gear for a road vehicle which makes it possible to selectively or adjustably change its toe change characteristic.

It is another object of the present invention to provide a rack and pinion steering gear of the above-mentioned character which is superior in structural strength to the comparable prior art device.

BRIEF DESCRIPTION OF THE DRAWINGS

The features and advantages of the rack and pinion steering gear according to the present invention will become more clearly appreciated from the following description taken in conjunction with the accompanying drawings, in which like reference characters designate like or corresponding parts in several views and wherein.

DETAILED DESCRIPTION OF THE PREFERRED EMBODIMENTS

Figure 1:
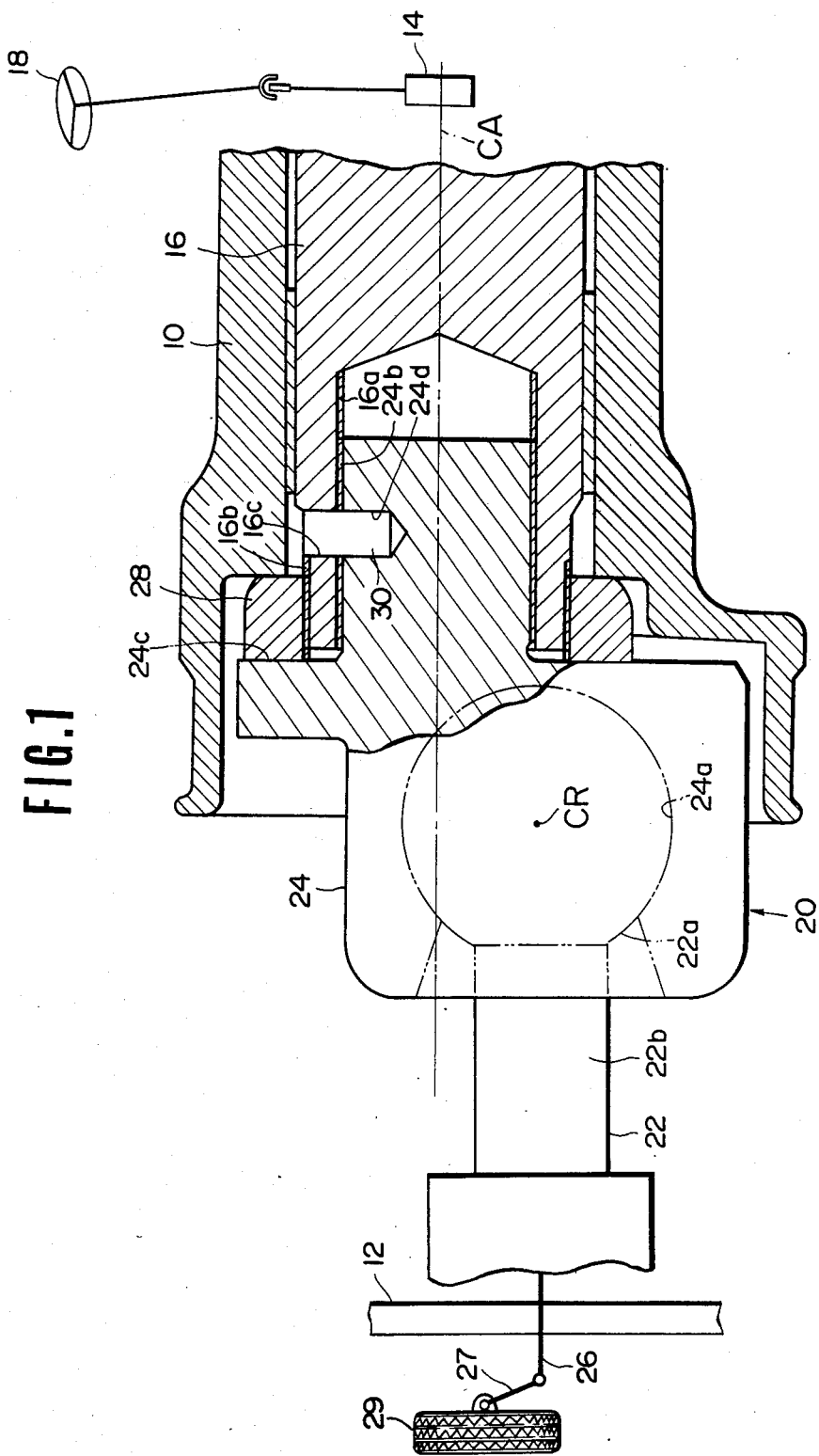
FIG. 1 is a fragmentary sectional view of a novel main portion of a rack and pinion steering gear according to an embodiment of the present invention, with some parts which are constructed and arranged in the conventional manner being schematically illustrated.

Referring now to FIG. 1, designated by the reference numeral 10 is a gear housing which is mounted on a vehicle body 12 in a manner to elongate in the lateral directions of same. The gear housing 10 encloses and supports in a rotatable manner a pinion 14 and a rack gear 16. The pinion 14 is connected to a manually operated steering wheel 18 to rotate together therewith, and the rack gear 16 is meshed with the pinion 14 for lateral reciprocating motion.

As is commonly known, rotation of the steering wheel 18 causes the pinion 18 to rotate and move the rack gear 16 in the lateral directions of the vehicle body 12.

The rack gear 16 which is disposed within the gear housing 10 and elongates in the lateral directions of the vehicle body 12 is formed at an end thereof with a threaded hole or an internal thread 16a which is axially aligned with the center axis CA of the rack gear 16.

Designated by the reference numeral 20 is a ball joint consisting of a ball member 22 and a socket member 24. The socket member 24 is formed with a socket 24a at an end and a threaded shank or an external thread 24b at the other end. The external thread 24b is screwed into the internal thread 16a, whereby to fasten the socket member 24 to the end of the rack gear 16. The socket 24 is disposed so that its center CR is offset from the center axis CA of the rack gear 16 by a predetermined distance. The socket member 24 has a stepped configuration in the axial direction of the external thread 24b to have an annular shoulder 24c which is located between the socket 24a and the external thread 24b and to which the axis of the external thread 24b is perpendicular.

The ball member 22 is formed with a ball 22a at an end and a shank 22b consecutively extending from the ball 22a toward the other end. The ball 22a is movably received in the socket 24a of the socket member 24 and the shank 22b is bolted to or otherwise secured to an inner end of a tie rod 26 which in turn operatively connected through a knuckle arm 27 to a steerable vehicle wheel 29.

The rack gear 16 is also formed with a threaded peripheral portion or an external thread 16b concentrically encircling the internal thread 16a. A lock nut 28 is screwed onto the external thread 16b of the rack gear 16 in such a manner as to be tig-htly pressed against the shoulder 24c for thereby preventing the relative movement between the internal thread 16a of the rack gear 16 and the external thread 24b of the socket member 24. Designated by the reference numeral 30 is a lock pin for further preventing the relative movement between the internal thread 16a of the rack gear 16 and the external thread 24b of the socket member 24. To this end, the socket member 24 is formed with a radial hole 24d at a portion having the external thread 24b, while the rack member 16 is formed with a radial through hole 16c at a portion having the concentric internal and external threads 16a and 16b. The holes 16c and 24d are axially alignable with each other and into which the lock pin 30 is force-fitted. The socket member 24 is thus assuredly prevented from becoming loose.

The ball joint 20 is attached to the rack gear 16 in the following manner. Firstly, the rack gear 16 is held in a condition projecting at an end from the gear housing 10, and the lock nut 28 is screwed onto the external thread 16b until the end of the rack gear 16 slightly projects from the lock nut 28. Secondly, the external thread 24b of the socket member 24 is screwed into the internal thread 16a of the rack 16 until the shoulder 24c of the socket member 24 abuts upon the distal end of the rack gear 16. At this time, the center CR of rotary motion of the ball joint 20 can be moved about the center axis CA of the rack gear 16 by turning the external thread 24b within an angle of 360° in the direction of removal. This makes it possible to arrange the center CR of rotary motion of the ball joint 20 at a position where the steering gear effects desired toe change and steering characteristics while allowing the gear housing 10 to be arranged at a place where it does not interfere or contact with a transmission, etc. For example, in the case where the gear housing 10 is arranged to assume a relatively high position so as not to interfere or contact with the transmission, etc., the center CR of rotary motion of the ball joint 20 can be positioned lower than the center axis CA of the rack gear 16, whereby to enable the steering gear to effect a desired toe change characteristic without deteriorating a steering characteristic. On the other hand, in the case where the gear housing 10 is arranged at a relatively rearward place so as not to contact the transmission, etc., the center CR of rotary motion of the ball joint 20 can be positioned more forward than the center axis CA of the rack gear 16, whereby to enable the steering gear to effect a desired steering characteristic without deteriorating a toe change characteristic. Furthermore, in the case where the gear housing 10 is arranged at a relatively high and rearward place so as not to interfere or contact with the transmission, etc., the center CR of rotary motion of the ball joint 20 can be positioned more forward and lower than the center axis CA of the rack gear 16, whereby to enable the steering gear to effect desired toe change and steering characteristics.

When the center CR of rotary motion of the ball joint 20 assumes a position enabling the steering gear to effect desired toe change and steering characteristics, the lock nut 28 is turned to be pressed against the shoulder 24c of the socket member 24, whereby to prevent the relative movement between the rack gear 16 and the socket member 24. Then, the holes 16c and 24d are machined, in which the lock pin 30 is force-fitted. By this, even if the lock nut 28 becomes loose due to the vibrations of the vehicle body 12, the relative movement between the rack gear 16 and the socket member 24 is assuredly prevented by the lock pin 30.

Since this embodiment does not require to have such a taper hole and a flat cut as in the foregoing prior art arrangement, it is superior in structural strength thereto and therefore can be more compact and light-weight as compared with same.

Figure 2:
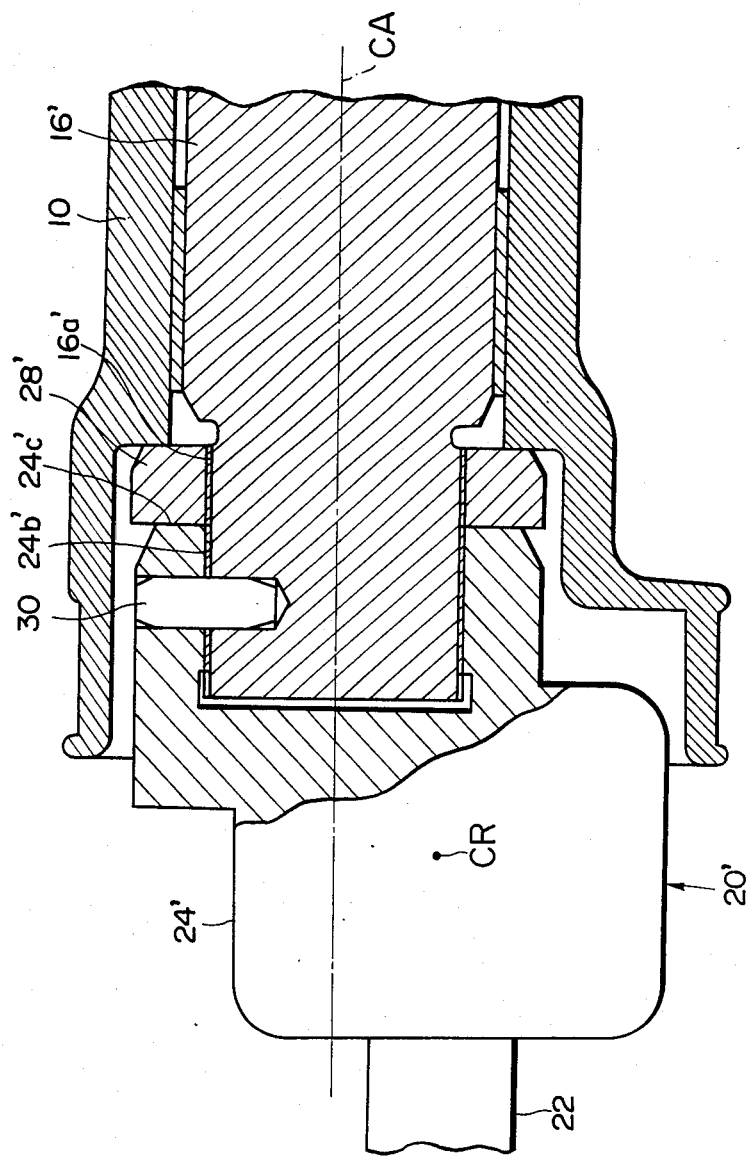
FIGS. 2 and 3 are views similar to FIG. 1 but showing modifications of the present invention.

FIG. 2 shows a modification of the present invention.

In this modification, a rack gear 16' is formed at an end thereof with a threaded peripheral wall or an external thread 16'a which is axially aligned with the center axis CA of the rack gear 16'. A socket member 24' of a ball joint 20' is formed at an end thereof with a threaded hole or an internal thread 24'b which is screwed onto the external thread 16'a of the rack gear 16'. A lock nut 28' is screwed onto the external thread 16'a of the rack gear 16' and pressed against an annular shoulder 24'c of the socket member 24' to prevent relative movement between the rack gear 16' and the socket member 24'. The annular shoulder 24'c in this embodiment is formed at a distal end of the socket member 24 or at a free end of the internal thread 24'b. In this embodiment, the socket member 24' and the lock nut 28' are adapted to be screwed onto the common external thread 16'a of the rack gear 16'. This embodiment thus can effect a reduced number of manufacturing processes and therefore a reduced manufacturing cost as compared with the embodiment of FIG. 1. Except for the above, this embodiment can produce substantially the same effect as the previous embodiment.

Figure 3:
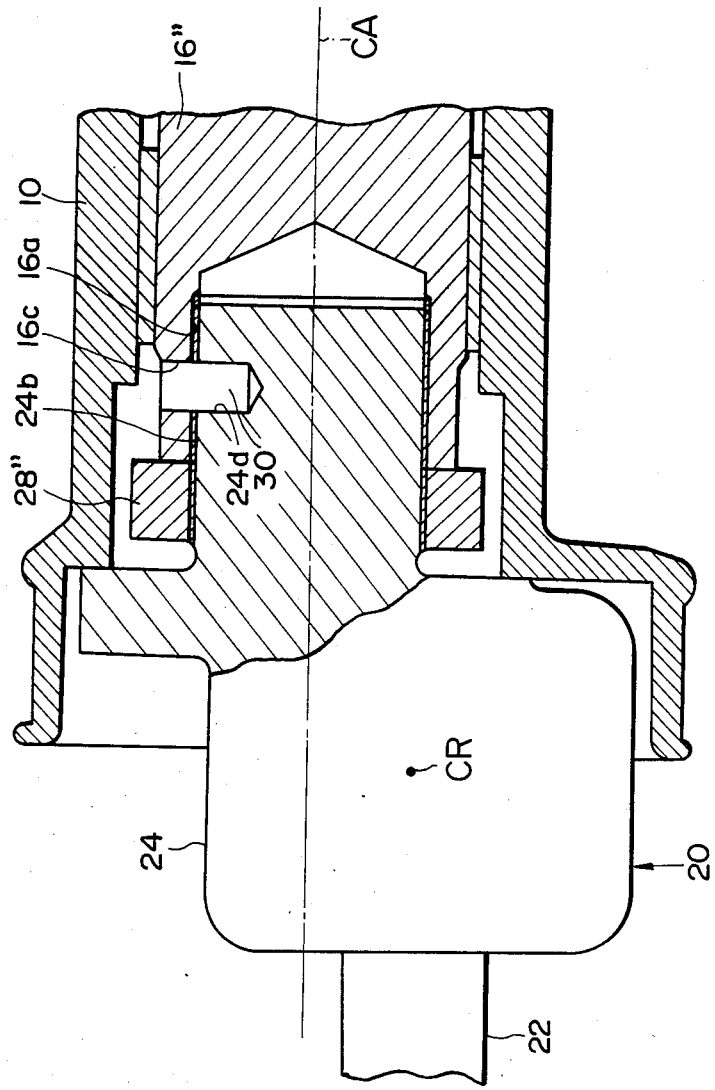

FIG. 3 shows a further modification of the present invention.

In this embodiment, a rack gear 16" is formed with an internal thread 16a but not with an external thread 16b as in the embodiment of FIG. 1. A lock nut 28" is screwed onto the external thread 24b of the socket member 24 and pressed against the distal end of the rack gear 16". In this embodiment, the rack gear 16" and the lock nut 28" are screwed onto the common external thread 24b of the socket member 24. This embodiment thus can effect a reduced number of manufacturing processes and a reduced manufacturing expense as compared with the embodiment of FIG. 1. Except for the above, this embodiment can produce substantially the same effect as the embodiment of FIG. 1.

While the present invention has been described and shown as to only an end of a rack gear and its associated parts, the other end and the associated parts thereof are constructed and arranged in the same way as having been described and shown in the foregoing.

What is claimed is:

1. A rack and pinion steering gear for a road vehicle comprising:
　a pinion rotatable with a manually operated steering wheel;
　a rack gear meshed with said pinion for reciprocating motion;
　a tie rod for transmitting motion of said rack gear to a steerable vehicle wheel; and
　a ball joint connecting said tie rod to said rack gear, said ball joint being constructed to have a center of rotary motion which is offset from the center axis of said rack gear and to be adjustable to selectively change the direction in which the center of rotary motion is set apart from the center axis of said rack gear;
　in which said ball joint comprises a socket member having at an end a socket whose center coincides with said center of rotary motion and a ball member having at an end a ball which is movably received in said socket and secured at the other end to said tie rod, said socket member having at the other end a cylindrical threaded portion the axis of which is offset from the center of said socket, said rack gear having at an end a cylindrical threaded portion which is axially aligned with the center axis of said rack gear and to which the threaded portion of said socket member is fastened; and locking means for preventing relative movement of said socket member and said rack gear.

2. A rack and pinion steering gear for a road vehicle as set forth in claim 1, in which said means for selectively adjusting the direction of offset provides for positioning said center of rotary motion at points defining a plane perpendicular to said center axis of said rack gear.

3. A rack and pinion steering gear for a road vehicle as set forth in claim 1, in which said threaded portion of said socket member comprises an external thread and said threaded portion of said rack gear comprises an internal thread, and in which said rack gear further comprises an external thread concentrically around said internal thread, said socket member being also formed with an annular shoulder which is located between said socket and said external thread and to which the axis of said external thread is perpendicular, and in which said locking means of said ball joint further comprises a lock nut which is screwed onto said external thread of said rack gear and pressed against said shoulder of said socket member to prevent relative movement between said socket member and said rack gear.

4. A rack and pinion steering gear for a road vehicle as set forth in claim 3, in which said socket member is formed at a portion having said external thread with a radial hole and said rack gear is formed at a portion having said internal and external threads with a radial through hole which is axially alignable with said radial hole of said socket member when the direction in which the center of rotary motion of said ball joint is set apart from the center axis of said rack gear is a desired one, and in which said locking means of said ball joint further comprises a lock pin which is force-fitted in said radial holes to prevent relative movement between said socket member and said rack gear.

5. A rack and pinion steering gear for a road vehicle as set forth in claim 1, in which said threaded portion of said socket member comprises an internal thread and said threaded portion of said rack gear comprises an external thread, and said socket member is also formed with an annular shoulder which is located at a free end of said internal thread and to which the axis of said internal thread is perpendicular, and in which said locking means of said ball joint further comprises a lock nut which is screwed onto said external thread of said rack gear and pressed against said shoulder to prevent relative movement between said socket member and said rack gear.

6. A rack and pinion steering gear for a road vehicle as set forth in claim 5, in which said socket member is formed at a portion having said internal thread with a radial through hole and said rack gear is formed at a portion having said external thread with a radial hole which is axially alignable with said radial hole of said socket member when the direction in which the center of rotary motion of said ball joint is set apart from the center axis of said rack gear is a desired one, and in which said locking means of said ball joint further comprises a lock pin which is force-fitted in said radial holes to prevent relative movement between said socket member and said rack gear.

7. A rack and pinion steering gear for a road vehicle as set forth in claim 1, in which said threaded portion of said socket member comprises an external thread and said threaded portion of said rack gear comprises an internal thread, and in which said locking means of said ball joint further comprises a lock nut which is screwed onto said external thread of said socket member and pressed against the distal end of said rack gear to prevent relative movement between said socket member and said rack gear.

8. A rack and pinion steering gear for a road vehicle as set forth in claim 7, in which said socket member is formed at a portion having said external thread with a radial hole and said rack gear is formed at a portion having said internal thread with a radial through hole which is axially alignable with said radial hole of said socket member when the direction in which the center of rotary motion of said ball joint is set apart from the center axis of said rack gear is a desired one, and in which said locking means of said ball joint further comprises a lock pin which is force-fitted in said radial holes to prevent relative movement between said socket and said rack gear.

9. A rack and pinion steering gear for a road vehicle as set forth in claim 1, wherein said means for selectively adjusting the direction of offset provides for rotating said socket about an axis parallel to said center axis of said rack gear.

* * * * *